United States Patent [19]

Plunkett

[11] Patent Number: 5,727,795
[45] Date of Patent: Mar. 17, 1998

[54] SINGLE LAYER OR MULTI-LAYER METAL CYLINDER HEAD GASKET AND METHOD OF MAKING THE SAME

[75] Inventor: Tom P. Plunkett, Lemont, Ill.

[73] Assignee: Dana Corporation, Toledo, Ohio

[21] Appl. No.: 752,122

[22] Filed: Nov. 20, 1996

[51] Int. Cl.[6] ................................................ F16J 15/08
[52] U.S. Cl. .................... 277/235 B; 277/236; 29/888.3
[58] Field of Search ................................ 277/233, 234, 277/235 R, 235 B, 236; 29/521, 888.3

[56] References Cited

U.S. PATENT DOCUMENTS

| | | | |
|---|---|---|---|
| 2,156,662 | 5/1939 | Wills | 277/235 B |
| 3,843,141 | 10/1974 | Kuhn | 277/235 B |
| 4,836,562 | 6/1989 | Yoshino | 277/235 B |
| 4,976,445 | 12/1990 | Udagawa | 277/231 |
| 4,995,624 | 2/1991 | Udagawa et al. | 277/235 B |
| 5,205,566 | 4/1993 | Ueta et al. | 277/180 |
| 5,209,504 | 5/1993 | Udagawa et al. | 277/235 B |
| 5,213,345 | 5/1993 | Udagawa | 277/235 B |
| 5,240,261 | 8/1993 | Udagawa et al. | 277/235 B |
| 5,294,135 | 3/1994 | Kubouchi et al. | 277/235 B |
| 5,310,196 | 5/1994 | Kawaguchi et al. | 277/180 |
| 5,348,315 | 9/1994 | Kawaguchi et al. | 277/235 B |
| 5,451,063 | 9/1995 | Udagawa et al. | 277/235 B |
| 5,522,604 | 6/1996 | Weiss et al. | 277/235 B |

FOREIGN PATENT DOCUMENTS

| | | | |
|---|---|---|---|
| 0523946 | 1/1993 | European Pat. Off. | 277/235 B |
| 226763 | 12/1984 | Japan | 277/235 B |
| 0143368 | 6/1988 | Japan | 277/235 B |
| 5026350 | 2/1993 | Japan | 277/235 B |
| 5052267 | 3/1993 | Japan | 277/235 B |
| 5065959 | 3/1993 | Japan | 277/235 B |

*Primary Examiner*—Daniel G. DePumpo
*Assistant Examiner*—John L. Beres
*Attorney, Agent, or Firm*—Rader, Fishman & Grauer PLLC

[57] ABSTRACT

A metallic gasket for use in an internal combustion engine has seals around the gasket openings which are formed by a two-step coining operation plus a folding operation. The gasket has a base plate including a folding portion located between an edge of an opening and a fold line. A channel and a reduced thickness portion are formed in the folding portion by a first coining operation. The channel is spaced from the edge of the opening and spaced from the fold line. Next the folding portion is folded back onto the base plate of the gasket. Finally, a second coining operation takes place to flatten the folded seal to a final thickness and produces material flow between the base plate and the folding portion.

16 Claims, 1 Drawing Sheet

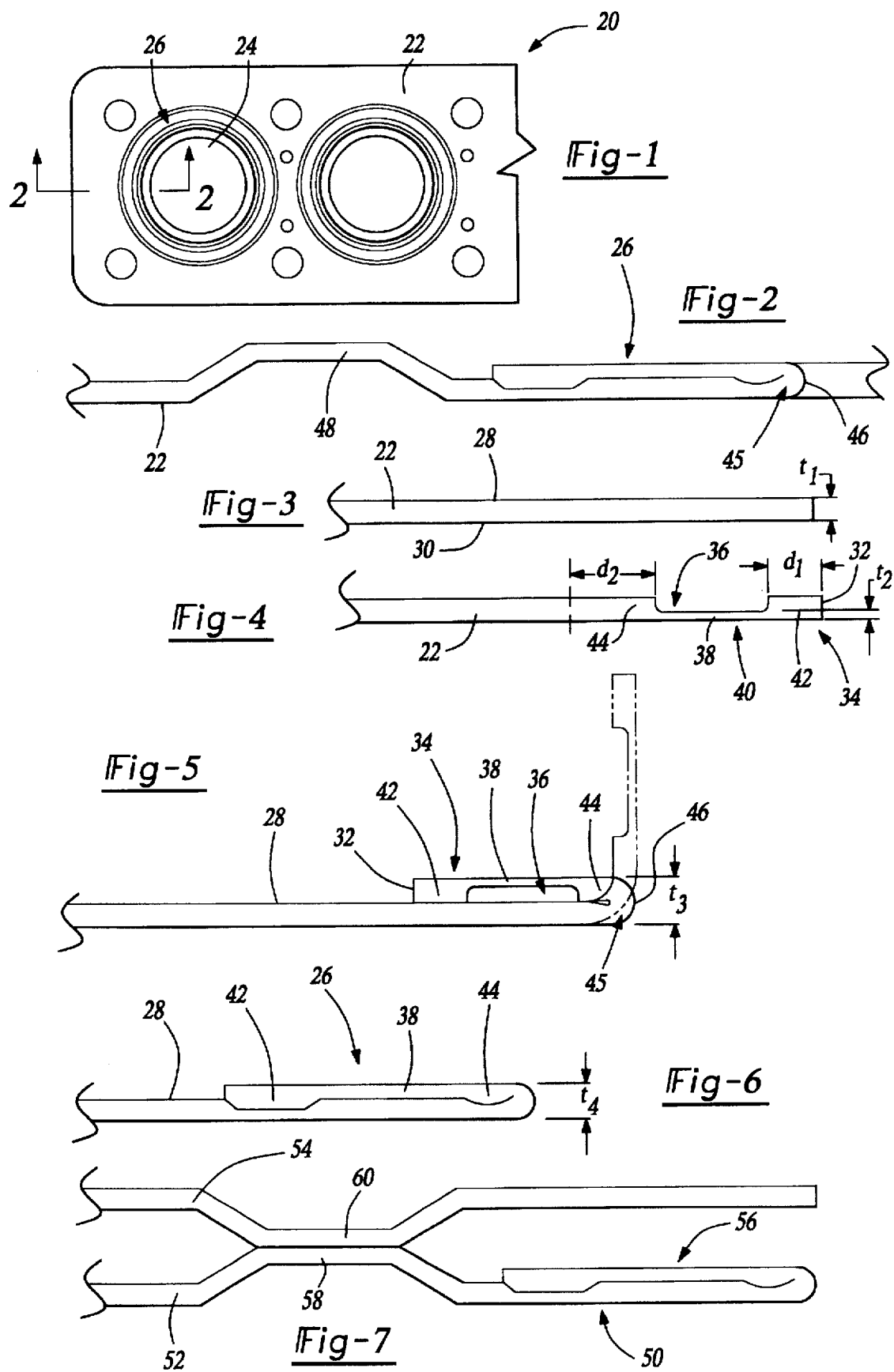

SINGLE LAYER OR MULTI-LAYER METAL CYLINDER HEAD GASKET AND METHOD OF MAKING THE SAME

FIELD OF THE INVENTION

The present invention relates to a metal cylinder head gasket used to seal the joint surfaces of a cylinder head and a cylinder block of an engine. More particularly, the invention relates to a gasket having a seal around the combustion chamber opening formed by a two-step coining operation in combination with a folding operation.

BACKGROUND OF THE INVENTION

A gasket made predominately of a metal material has been used to seal the joint where a cylinder head interfaces with a cylinder block of an engine. There are openings in the gasket which cooperate with the combustion chambers, water passages and oil passages in the engine. These gasket openings typically have some kind of structure to enhance sealing around the openings.

Known ways to enhance gasket opening sealing include the use of an extra layer of sealing material, a welded shim, or a thermal spray deposit added to an outer surface of a gasket base plate. Another known method folds the region around the gasket opening back onto the base plate itself to create a raised sealing surface. The prior art discloses folding the base plate at a region having less cross-sectional thickness than the rest of the base plate. Other prior art seals formed by folding maintain a generally consistent thickness along the entire base plate.

The prior art gasket designs are not cost-effective and are often prone to cracking in the region of folding. In particular, the designs utilizing an extra seal element are more expensive, incur additional assembly and labor expenses and require more sophisticated inventory tracking of separate components.

Additionally, an extra element seal design is limited in the degree that the seal operating thickness can be reduced since the extra seal element is added to the thickness of the base plate. Thus, the operating thickness is only as thin as the base plate thickness plus the extra seal element thickness. In the case of folded seal designs having reduced thickness material at the fold region, there is necessarily reduced strength in that region. Therefore, there is a need for a gasket having a minimum number of parts with a seal operating thickness that can be reduced without sacrificing strength.

SUMMARY OF THE INVENTION

The present invention is directed to a metal gasket having additional structure around openings, such as a combustion opening, formed by a two-step coining or flattening operation combined with a folding operation.

The metallic gasket of the present invention includes a base plate having a folding portion adjacent a gasket opening. The folding portion has a channel of reduced thickness formed by a first coining operation. The channel is spaced away from the initial edge of the opening and is also spaced away from a fold line. Therefore, cold working during the coining operation will not tend to crack the metal when it is later folded.

After coining, the folding portion is folded back onto the base plate itself creating a fold region which defines a final edge of the gasket opening.

After folding, a second coining operation is preferably performed. This second coining operation flattens the folding portion against the base plate such that material flow occurs therebetween. Non-coined material adjacent each side of the channel flows into and displaces some base plate material while some base plate material flows into and at least partially fills the channel. If coining were to take place at the initial edge of the opening or near the fold region, the resulting work hardened surfaces would have very limited material flow and greater susceptibility to cracking. The present invention, however, coins an area located away from both the initial edge of the opening and the fold region. Thus, the fold region remains strong, being made from material having the same thickness as the base plate.

The folding and flattening operations create a stopper or seal having a seal operating thickness only slightly larger than the base plate thickness. Alternatively, the seal thickness can be selectively varied to produce a contoured or wave-like sealing surface around the opening. It is also envisaged to form a bead outwardly spaced from the seal to act as a secondary sealing structure.

The gasket of the present invention has the advantage of controlling seal operating thickness by controlling one or more design parameters, including, but not limited to, channel width, channel depth, channel shape, and base plate thickness. Such increased control provides the ability to easily customize a gasket for a particular gasket application. The present invention also provides a more flexible design which can easily vary seal operating thickness to meet a greater range of gasket operating conditions.

BRIEF DESCRIPTION OF THE DRAWINGS

The features and inventive aspects of the present invention will become more apparent upon reading the following detailed description, claims, and drawings, of which the following is a brief description:

FIG. 1 is a plan view of a gasket according to the present invention.

FIG. 2 is a sectional view of a gasket having a seal formed according to the present invention.

FIGS. 3–6 show individual stages in fabricating a seal around the combustion openings of the gasket.

FIG. 7 shows a multi-layer gasket according to the present invention.

DETAILED DESCRIPTION OF PREFERRED EMBODIMENTS

FIG. 1 shows a gasket 20 constructed from a single thin base plate 22 and having multiple holes or openings 24 to accommodate, for example, combustion chambers (not shown) of an engine. Each hole 24 has a seal 26 which encircles the perimeter of hole 24 to provide adequate sealing of combustion gases and fluids.

FIGS. 3–6 show individual stages involved in forming seal 26. The completed seal is shown in FIG. 2. Referring to FIG. 3, base plate 22 has an upper surface 28 and a lower surface 30 which define a thickness t1. Preferably, plate 22 is an annealed, stainless or low carbon steel. The thickness t1 is preferably approximately 0.15–0.25mm.

FIG. 4 depicts a portion of plate 22 having an initial edge 32 defined by a cutout for hole 24. There is also shown a folding line L spaced from initial edge 32. A folding portion 34 extends between folding line L and initial edge 32. Folding portion 34 includes a channel 36 located directly above a reduced thickness portion 38. Channel 36 and reduced thickness portion 38 are formed by a first coining operation which cold works a coining area 40 of the base plate 22, creating a reduced cross-sectional thickness t2, typically about 1 mm. There is a first non-coined area 42 located between channel 36 and initial edge 32 and a second non-coined area 44 located between channel 36 and fold line L. Non-coined areas 42, 44 are initially generally rectangular in shape.

Channel 36 and reduced thickness portion 38 are spaced away from initial edge 32 by a predetermined distance, d1. Similarly, channel 36 and reduced thickness portion 38 are spaced a predetermined distance d2 away from fold line L. As a result, the thickness of the region near initial edge 32 and the region near the fold line L are approximately equal to the base plate thickness t1.

FIG. 5 shows an intermediate stage during the folding process. Folding portion 34 is folded back toward the upper surface 28, as shown in phantom. Folding continues until the folding portion 34 abuts upper surface 28, as depicted in solid lines in FIG. 5. This folding operation creates an initial seal thickness t3 which is approximately twice the thickness of t1.

Once folding is complete, channel 36 entirely overlies upper surface 28. Therefore, in a fold region 45 which includes fold line L and defines a final edge 46 of opening 24, there is no reduced thickness material. In other words, the fold is made at a location on the base plate 22 having a thickness, t1. The full thickness provides strength and ensures against cracking when plate 22 is folded.

Once folding portion 34 overlies upper surface 28, a second coining operation is optionally, but preferably, performed. The second coining operation substantially flattens seal 26 by compressing folding portion 34 against plate 22 such that material flow occurs between folding portion 34 and upper surface 28. The first and second non-coined areas 42, 44 in folding portion 34 flow into and displace some of the material of upper surface 28 while some of the material of upper surface 28 flows into at least part of channel 36. Thus, the resulting seal thickness is only slightly greater than the base plate thickness t1. After flattening, first non-coined area 42 is generally trapezoidal in shape while second non-coined area 44 is generally semi-circular. In addition, the fold region 45 is made from material having the same thin plate thickness t1. Preferably, reduced thickness portion 38 contacts upper surface 28, such that channel 36 is completely filled. Thus, seal 26 is flattened to a final seal thickness t4 that is less than the initial seal thickness t3. Seal thickness t4 is approximately equal to base plate thickness t1 plus reduced cross-sectional thickness t2. Preferably the seal thickness is about 0.1 mm thicker than the thin plate 22, e.g. approximately 0.25–0.35 mm.

Alternatively, the seal thickness 14 can be selectively varied to produce a contoured or wave-like sealing surface around the perimeter of combustion openings 24.

It is also envisaged that folding portion 34 may be coined on its lower surface and folded back onto lower surface 30 instead of upper surface 28.

The completed seal 26 is shown in FIG. 2. Bead 48 is formed adjacent to seal 26 to act as a secondary combustion seal. Bead 48 is optional, but preferred to ensure satisfactory sealing.

FIG. 7 shows an embodiment of the present invention formed as a multi-layer gasket. The illustrated gasket 50 includes two layers of thin plates 52 and 54 mounted one atop the other. However, any number of layers may be used. In the illustrated embodiment, lower layer 52 has the same construction and seal arrangement as the single layer gasket 20 described above. Specifically, a seal 56 is formed on lower layer 52 using the two-step coining process of the present invention. A bead 58 is also provided.

The upper layer 54 includes a bead 60 and generally does not have a separate seal, although a seal may be optionally provided. Thus, upper layer 54 consists of a thin plate having a bead 60. The preferred material for the upper layer is high temper stainless steel.

The multi-layer gasket 50 is constructed such that beads 58 and 60 are aligned. The shape of the beads can be selected from any commonly known geometric shape and can be varied to achieve uniform sealing stresses in both layers.

Preferably, the first and second coining operations are performed in two separate steps, allowing reasonable press tonnages to be used and maintaining dimensional stability of the gasket.

To control seal operating thickness, one or more design parameters can be varied, including, but not limited to, channel width, channel depth, channel shape, and base plate thickness. Such increased control provides the ability to easily customize a gasket for a particular gasket application.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. In a gasket including a first metal plate having upper and lower surfaces and a first thickness therebetween, and being provided with at least one opening, the improvement comprising:

said first plate comprising a folding portion which extends from a fold line to an initial edge adjacent the perimeter of said at least one opening;

said folding portion having a channel and a reduced thickness portion relative to said first thickness and wherein said channel and said reduced portion are spaced away from both said initial edge and said fold line;

said fold line being located where said first plate has said first thickness;

said folding portion being folded at a fold region, including said fold line, back onto one of said surfaces of said first plate such that said reduced thickness portion and said channel entirely overlie and oppose said one of said surfaces to form a seal around said at least one opening;

said fold region defining a final edge of said at least one opening; and said seal having a thickness greater than said first thickness.

2. The gasket of claim 1, wherein said folding portion is compressed against said one of said surfaces such that some material of said one of said surfaces at least partially fills said channel.

3. The gasket of claim 2, wherein said first plate is selected from one of annealed stainless steel or annealed low carbon steel.

4. The gasket of claim 2, wherein said seal thickness is selectively varied to provide a contoured sealing surface.

5. The gasket of claim 2, wherein material from said one of said surfaces substantially fills said channel and material from said folding portion is embedded into said one of said surfaces.

6. The gasket of claim 2, further comprising a first bead adjacent said seal.

7. The gasket of claim 6, further comprising a second plate having a second bead and being positioned atop said first bead of said first plate so as to provide a multi-layer gasket.

8. The gasket of claim 7, wherein said first and second beads have predetermined shapes selected to achieve uniform sealing stresses in each layer.

9. In a gasket including a first metal plate having upper and lower surfaces and a first thickness therebetween, and being provided with at least one opening, the improvement comprising:

a folding portion on said first plate which extends from a fold line to an initial edge adjacent the perimeter of said opening and wherein said fold line is located where said first plate has said first thickness;

a coined area of said folding portion including a channel and a reduced thickness portion relative to said first thickness, wherein said channel and said reduced portion are spaced away from both said initial edge and said fold line;

first and second non-coined areas of said folding portion, said first non-coined area being located between said initial edge and said channel, said second non-coined area being located between said channel and said fold line;

said folding portion being folded at a fold region, including said fold line, back onto one of said surfaces of said first plate such that said reduced thickness portion and said channel entirely overlie and oppose said one of said surfaces;

said fold region defining a final edge of said opening; and said folding portion being compressed against said one of said surfaces such that material of said one of said surfaces at least partially fills said channel and said non-coined areas are imbedded into said one of said surfaces creating a seal surrounding said opening, said seal having a thickness greater than said first thickness.

10. The gasket of claim 9, further comprising a first bead located adjacent said seal.

11. The gasket of claim 10, further comprising a second plate having a second bead, said second plate positioned on said first plate so as to align said first and second beads thereby constructing a multi-layer gasket.

12. The gasket of claim 9, wherein said first non-coined area has a shape that is generally the same as a shape of said second non-coined area.

13. The gasket of claim 12, wherein said first and second non-coined area shapes are generally rectangular.

14. The gasket of claim 9, wherein said first non-coined area has a shape that is generally dissimilar to a shape of said second non-coined area.

15. The gasket of claim 14, wherein said first non-coined area shape is generally trapezoidal and said second non-coined area shape is generally semi-circular.

16. A gasket formed by the steps comprising:

providing a plate having a uniform thickness and at least one opening for a combustion chamber;

performing a first coining operation on said plate which simultaneously forms a channel surrounding said opening and a reduced thickness portion located below said channel;

folding said folding portion back onto a surface of said plate such that the reduced thickness portion and the channel entirely overlie said surface; and compressing said folding portion against said surface by performing a second coining operation, such that deformation occurs between said folding portion and said surface.

* * * * *